United States Patent
Ryu et al.

(10) Patent No.: US 11,546,025 B2
(45) Date of Patent: Jan. 3, 2023

(54) PRECODERS FOR MULTI-PANEL UPLINK TRANSMISSION

(71) Applicant: QUALCOMM Incorporated, San Diego, CA (US)

(72) Inventors: Jung Ho Ryu, Fort Lee, NJ (US); Kiran Venugopal, Raritan, NJ (US); Makesh Pravin John Wilson, San Diego, CA (US); Tianyang Bai, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 16/736,091

(22) Filed: Jan. 7, 2020

(65) Prior Publication Data
US 2020/0220592 A1 Jul. 9, 2020

Related U.S. Application Data

(60) Provisional application No. 62/790,429, filed on Jan. 9, 2019.

(51) Int. Cl.
*H04B 7/0404* (2017.01)
*H04B 7/0456* (2017.01)
(Continued)

(52) U.S. Cl.
CPC ......... *H04B 7/0456* (2013.01); *H04B 7/0404* (2013.01); *H04B 7/0626* (2013.01);
(Continued)

(58) Field of Classification Search
CPC .... H04B 7/022; H04B 7/0404; H04B 7/0456; H04B 7/0473; H04B 7/0626;
(Continued)

(56) References Cited

U.S. PATENT DOCUMENTS

| 2018/0183503 A1 | 6/2018 | Rahman et al. |
| 2018/0242327 A1 | 8/2018 | Frenne et al. |
| 2020/0336182 A1* | 10/2020 | Faxér ................. H04B 7/0469 |

FOREIGN PATENT DOCUMENTS

WO 2018127781 A1 7/2018

OTHER PUBLICATIONS

"3rd Generation Partnership Project; Technical Specification Group Radio Access Network; NR; Physical Channels and Modulation (Release 15)", 3GPP Standard, Technical Specification 38.211, Version 15.3.0, Sep. 2018 (Sep. 2018), 93 Pages.
(Continued)

*Primary Examiner* — Minh Trang T Nguyen
(74) *Attorney, Agent, or Firm* — Danai Nelisile Mhembere; Patterson & Sheridan, LLP

(57) ABSTRACT

Certain aspects of the present disclosure provide techniques for precoding for multi-panel uplink transmission. For codebook-based uplink transmission, a user equipment (UE) can determine one or more preferred or selected precoders for uplink transmission. The precoders can be from an expanded UE codebook that maps a first number of transmit layers at the UE to a second number of antenna ports at the UE, the layers and/or antenna ports associated with multiple uplink transmit panels at the UE. The UE sends an indication to a base station (BS) of the determined precoders and/or sends an uplink transmission using the determined precoders. For non-codebook based uplink transmission the UE receives first and second reference signals (RSs), from first and second ports of a BS, with first and second UE antenna panels. The UE computes precoders to use for uplink transmission based on the RSs.

28 Claims, 13 Drawing Sheets

(51) Int. Cl.
*H04B 7/06* (2006.01)
*H04L 5/00* (2006.01)
*H04W 72/04* (2009.01)

(52) U.S. Cl.
CPC ......... *H04B 7/0628* (2013.01); *H04B 7/0639* (2013.01); *H04L 5/0048* (2013.01); *H04W 72/042* (2013.01)

(58) Field of Classification Search
CPC .. H04B 7/0628; H04B 7/0639; H04B 7/0691; H04L 5/0023; H04L 5/0048; H04L 5/0051; H04L 5/0094; H04W 72/042
See application file for complete search history.

(56) References Cited

OTHER PUBLICATIONS

International Search Report and Written Opinion—PCT/US2020/012730—ISA/EPO—dated May 15, 2020.
Partial International Search Report—PCT/US2020/012730—ISA/EPO—dated Mar. 24, 2020.

\* cited by examiner

PRECODERS FOR MULTI-PANEL UPLINK TRANSMISSION

CROSS-REFERENCE TO RELATED APPLICATION(S)

This application claims benefit of and priority to U.S. Provisional Application No. 62/790,429, filed Jan. 9, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for uplink transmission.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes determining one or more precoders to use for an uplink transmission. The one or more precoders map a first number of transmit layers at the UE to a second number of antenna ports at the UE. The first number of layers, the second number of UE antenna ports, or both is associated with multiple uplink transmit panels at the UE. The method generally includes sending an uplink transmission using the determined one or more precoders.

Certain aspects provide another method for wireless communication by a UE. The method generally includes determining one or more precoders for uplink transmission. The one or more precoders map a first number of transmit layers at the apparatus to a second number of antenna ports at the apparatus. The method generally includes sending an indication to a base station (BS) of the one or more precoders.

Certain aspects provide another method for wireless communication by a UE. The method generally includes receiving a first reference signal (RS), from a first port of a BS, with a first UE antenna panel. The method generally includes receiving a second RS, from a second port of the BS, with a second UE antenna panel. The method generally includes computing one or more precoders to use for uplink transmission based on the first and second RSs.

Certain aspects provide an apparatus for wireless communication. The apparatus generally includes a memory and at least one processor coupled with the memory. The memory and apparatus are generally configured to determine one or more precoders to use for an uplink transmission. The one or more precoders map a first number of transmit layers at the apparatus to a second number of antenna ports at the apparatus. The first number of layers, the second number of antenna ports, or both is associated with multiple uplink transmit panels at the apparatus. The processor is generally configured to send an uplink transmission using the determined one or more precoders.

Certain aspects provide another apparatus for wireless communication. The apparatus generally includes a memory and at least one processor coupled with the memory. The memory and apparatus are generally configured to determine one or more precoders for uplink transmission. The one or more precoders map a first number of transmit layers at the apparatus to a second number of antenna ports at the apparatus. The processor is generally configured to send an indication to a BS of the one or more precoders.

Certain aspects provide another apparatus for wireless communication. The apparatus generally includes a memory and at least one processor coupled with the memory. The memory and apparatus are generally configured to receive a first RS, from a first port of a BS, with a first antenna panel. The processor is generally configured to receive a second RS, from a second port of the BS, with a second antenna panel. The processor is generally configured to compute one or more precoders to use for uplink transmission based on the first and second RSs.

Certain aspects provide an apparatus for wireless communication. The apparatus generally means for determining one or more precoders to use for an uplink transmission. The one or more precoders map a first number of transmit layers at the apparatus to a second number of antenna ports at the apparatus. The first number of layers, the second number of antenna ports, or both is associated with multiple uplink transmit panels at the apparatus. The apparatus generally includes means for sending an uplink transmission using the determined one or more precoders.

Certain aspects provide another apparatus for wireless communication. The apparatus generally includes means for determining one or more precoders for uplink transmission. The one or more precoders map a first number of transmit layers at the apparatus to a second number of antenna ports at the apparatus. The apparatus generally includes means for sending an indication to a BS of the one or more precoders.

Certain aspects provide another apparatus for wireless communication. The apparatus generally includes means for receiving a first RS, from a first port of a BS, with a first antenna panel. The apparatus generally includes means for receiving a second RS, from a second port of the BS, with a second antenna panel. The apparatus generally includes means for computing one or more precoders to use for uplink transmission based on the first and second RSs.

Certain aspects provide a computer readable medium having computer executable code stored thereon for wireless communication. The computer readable medium generally includes code for determining one or more precoders to use for an uplink transmission. The one or more precoders map a first number of transmit layers at a UE to a second number of antenna ports at the UE. The first number of layers, the second number of antenna ports, or both is associated with multiple uplink transmit panels at the UE. The computer readable medium generally includes code for sending an uplink transmission using the determined one or more precoders.

Certain aspects provide a computer readable medium having computer executable code stored thereon for wireless communication. The computer readable medium generally includes code for determining one or more precoders for uplink transmission. The one or more precoders map a first number of transmit layers at a UE to a second number of antenna ports at the UE. The computer readable medium generally includes code for sending an indication to a BS of the one or more precoders.

Certain aspects provide a computer readable medium having computer executable code stored thereon for wireless communication. The computer readable medium generally includes code for receiving a first RS, from a first port of a BS, with a first antenna panel. The computer readable medium generally includes code for receiving a second RS, from a second port of the BS, with a second antenna panel. The computer readable medium generally includes code for computing one or more precoders to use for uplink transmission based on the first and second RSs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
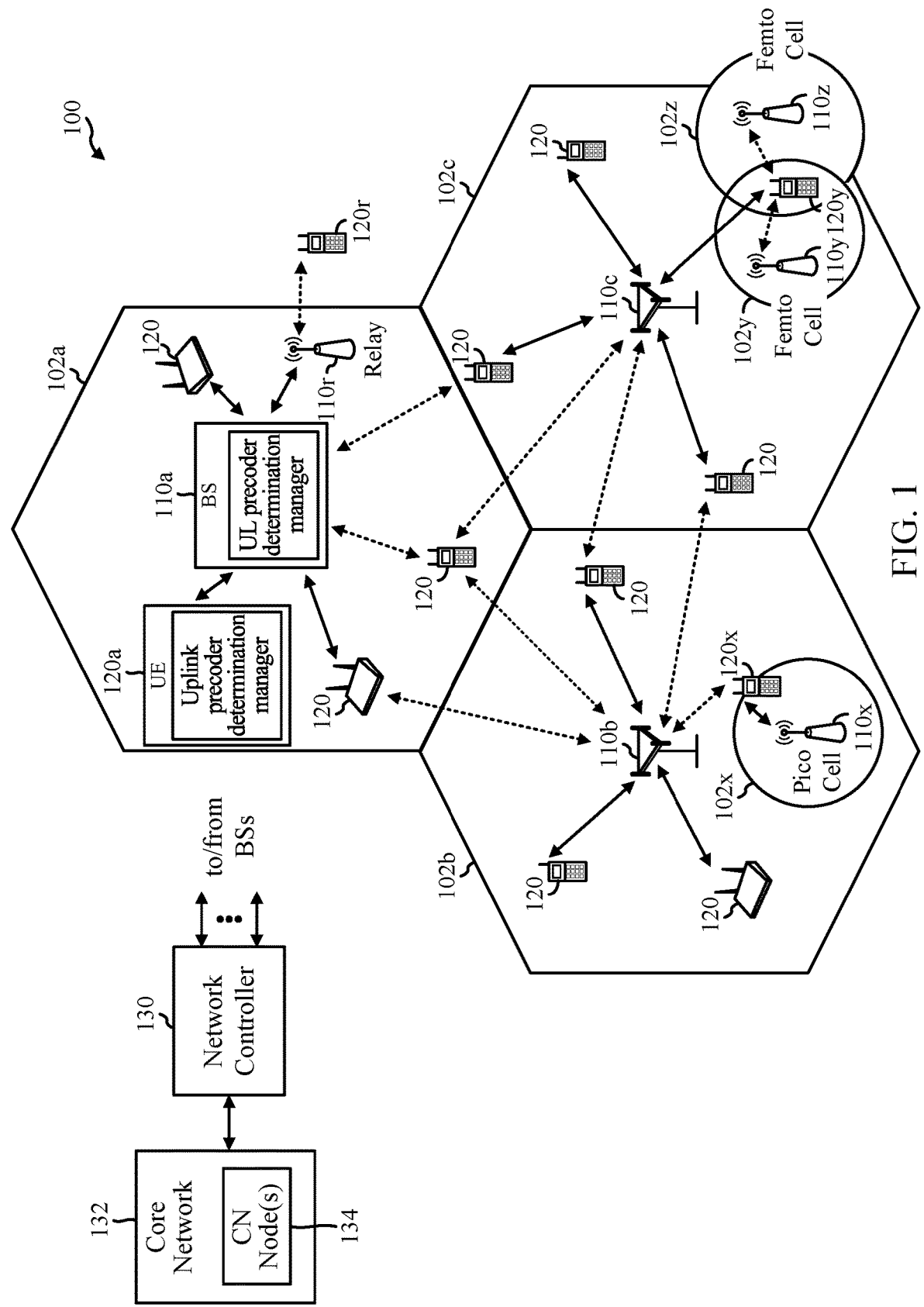
FIG. 1 is a block diagram conceptually illustrating an example telecommunications system, in accordance with certain aspects of the present disclosure.

Aspects of the present disclosure provide apparatus, methods, processing systems, and computer readable mediums for precoding for uplink transmission, such as multi-panel uplink transmission.

In certain systems, for codebook-based uplink transmission, the base station (BS) chooses the precoder for uplink transmission and signals the selected precoder to the user equipment (UE). The precoder maps one or more layers at the UE to one or more antenna ports. A layer may refer to a multiple-input multiple-output (MIMO layer (e.g., a data stream). The precoders may be designed for single panel uplink transmission. However, in certain systems, such as new radio (NR) systems, the UE may support multi-panel uplink transmission.

Accordingly, aspects of the present disclosure provide techniques for precoding for multi-panel uplink transmission. In some examples, an expanded codebook is provided. In some examples, the UE can indicate preferred or selected precoders to the BS. In some examples, the UE can indicate different precoders for different scenarios, such as depending on single or multi-panel uplink transmission. For codebook based transmission, one or more precoders are selected from a defined codebook. For non-codebook based transmission, the one or more precoders are computed (e.g., based on measurements of reference signals (RSs)). In some examples, for non-codebook based transmission, the BS can transmit simultaneous reference signals (RS) to the UE for the UE to compute precoders for multi-panel uplink transmission.

The following description provides examples of precoders for multi-panel uplink transmission, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, such as later technologies.

5G NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a New Radio (NR) or 5G network. As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other base stations or network nodes (not shown) in wireless communication network 100 through various types of backhaul interfaces (e.g., a direct physical connection, a wireless connection, a virtual network, or the like) using any suitable transport network. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120) that may be dispersed throughout the wireless communication network 100. Each UE 120 may be stationary or mobile. Wireless communication network 100 may also include relay stations (e.g., relay station 110r) that receive a transmission of data and/or other information from an upstream station (e.g., a BS 100a or a UE 120r) and send a transmission of the data and/or other information to a downstream station (e.g., a UE 120 or a BS 110), or that relays transmissions between UEs 120.

According to certain aspects, the UEs 120 may be configured with multiple transmission configurations (e.g., antenna arrays/panels and/or beams) for uplink transmission to the BSs 110. For example, as shown in FIG. 1, the UE 120a has an uplink precoder determination manager that may be configured for determining the precoders according to aspects described herein, such as preferred or selected precoders that may be determined from an expanded codebook for multi-panel uplink transmission or computed based on simultaneous reference signals (RS) transmitted from the BS 110a. The UE 120a may send an indication of the uplink precoders to the BS 110a. The BS 110a may receive the indication of uplink precoders from the UE 120a and may determine uplink precoders based on the indication. For example, as shown in FIG. 1, the BS 110a has an uplink precoder determination manager that may be configured for determining the uplink precoders for the UE 120a, according to aspects described herein.

Figure 2:
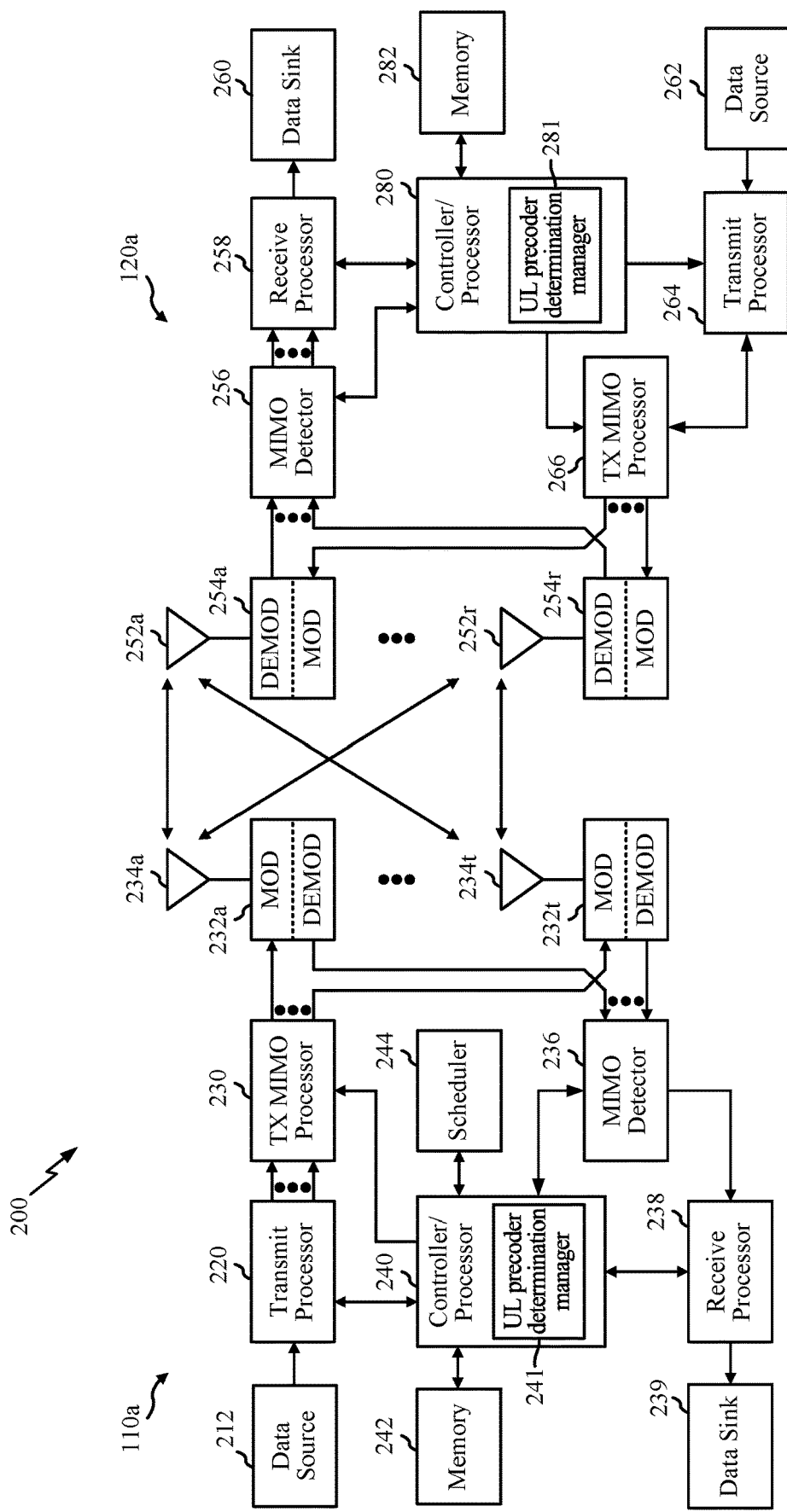
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the BS 110a. As shown in FIG. 2, the transmit processor 464 has an uplink precoder determination module that may be configured for determining one or more uplink precoders according to aspects described herein. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for precoding for multi-panel uplink transmission. The controllers/processors 240 and 280 may direct the operation at the BS 110a and the UE 120a, respectively. For example, as shown in FIG. 2, the processor 240 has an uplink precoder determination manager 241 and the processor 280 has an uplink precoder determination manager 281 that may be configured for uplink precoders for multi-panel uplink transmission, according to aspects described herein. The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) and/or single-carrier frequency division multiplexing (SC-FDM) on the uplink and/or downlink. OFDM and SC-FDM partition the system bandwidth into multiple orthogonal subcarriers, are also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

Figure 3:
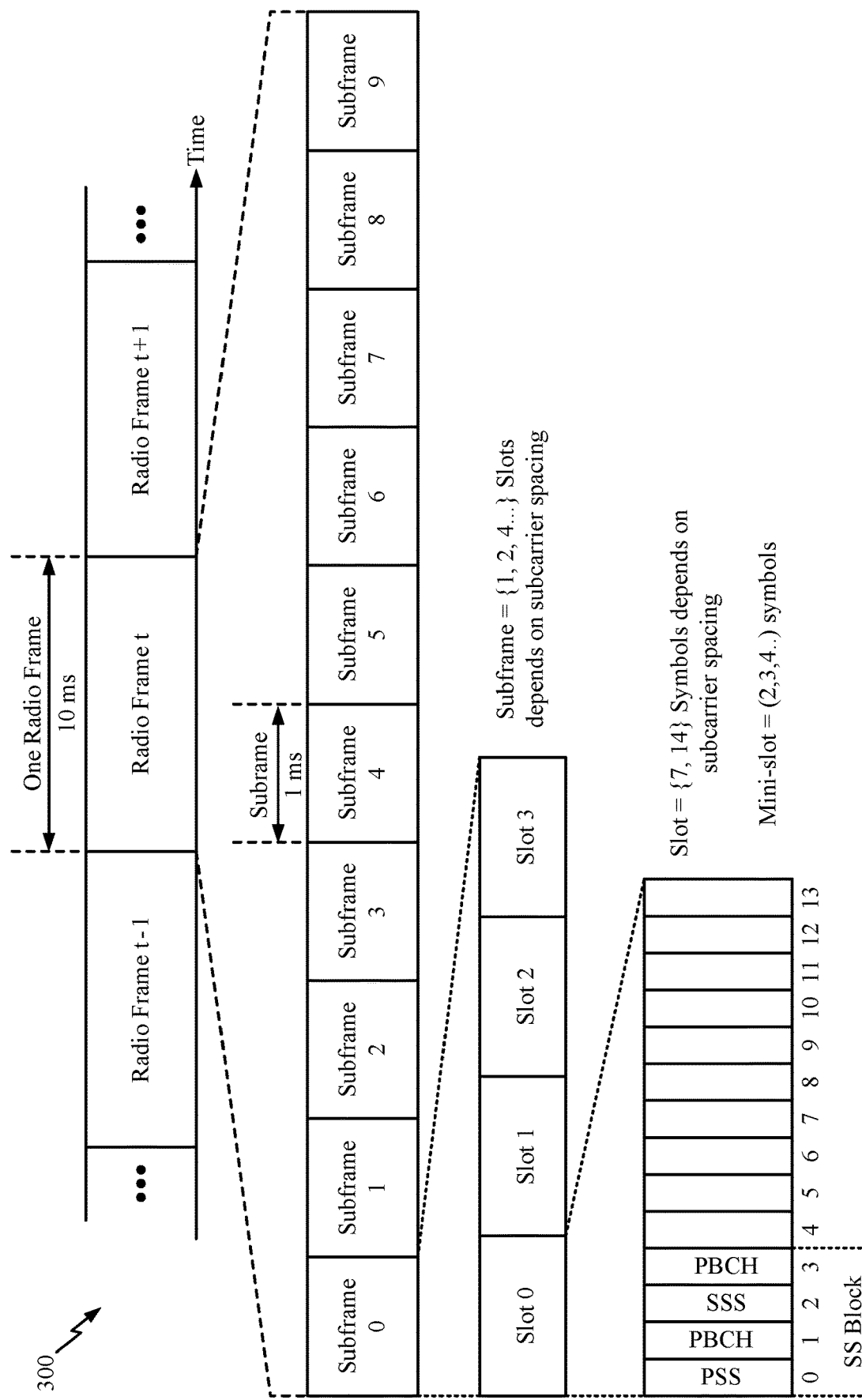
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing (SCS). Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In certain systems, a user equipment (UE) may be able to transmit uplink signals with different transmission configurations. The uplink transmissions with different transmission configurations may be simultaneous (e.g., actually simultaneous or near simultaneous, such as in a same transmission time interval (TTI)), and may use the same frequency band. The uplink transmissions may be to the serving base station (BS). As used herein, a transmission configuration may be associated with, but not limited to, transmission reception points (TRPs), antennas, antenna arrays/panels, beams, channels, links, and/or quasi co-location (QCL) groups.

In some cases, the UE can transmit simultaneous uplink transmissions using different transmission configurations. Suh transmission may be referred to as multi-panel uplink transmissions. In some examples, a UE may have up to sixteen antennas in one array/panel, and the UE may have multiple arrays/panels which may be located at various locations of the UE. In some examples, different arrays may use different beams to form multiple links. The different antennas, antenna panels, and/or beam cover different spatial directions.

Simultaneous uplink transmissions may allow increased throughput (e.g., by simultaneously transmitting data to the BS using the multiple antennas, beams, and/or panels) and/or increased reliability (e.g., by sending the same information from the multiple antennas, beams, and/or panels). In certain systems, such as NR (new radio or 5G systems), multi-panel uplink transmission may be configured for physical uplink shared channel (PUSCH) and/or sounding reference signal (SRS) transmissions by the UE. In some examples, the UE is configured with one or more SRS resource sets configuring SRS resources for SRS transmission. Each SRS resource set may be associated with a UE antenna panel for both codebook-based (e.g., beamformed) and non-codebook based (e.g., non-beamformed) PUSCH transmission. In some examples, the SRS resource indicator (SRI) field in downlink control information (DCI) may be used to indicate (by the BS) and select (by the UE) SRS resources from the configured SRS resource sets. For example, the BS and UE may be configured with a table or mapping of the SRI field (e.g., SRI values) to which SRS resource from which SRS resource set is to be used for a multi-panel uplink transmission. In some examples, the SRI in the DCI may indicate multiple SRS resources from one SRS resource set. In some examples, of the multiple SRS resources indicated by the BS, the UE may select one to use for uplink transmission.

Figure 4:
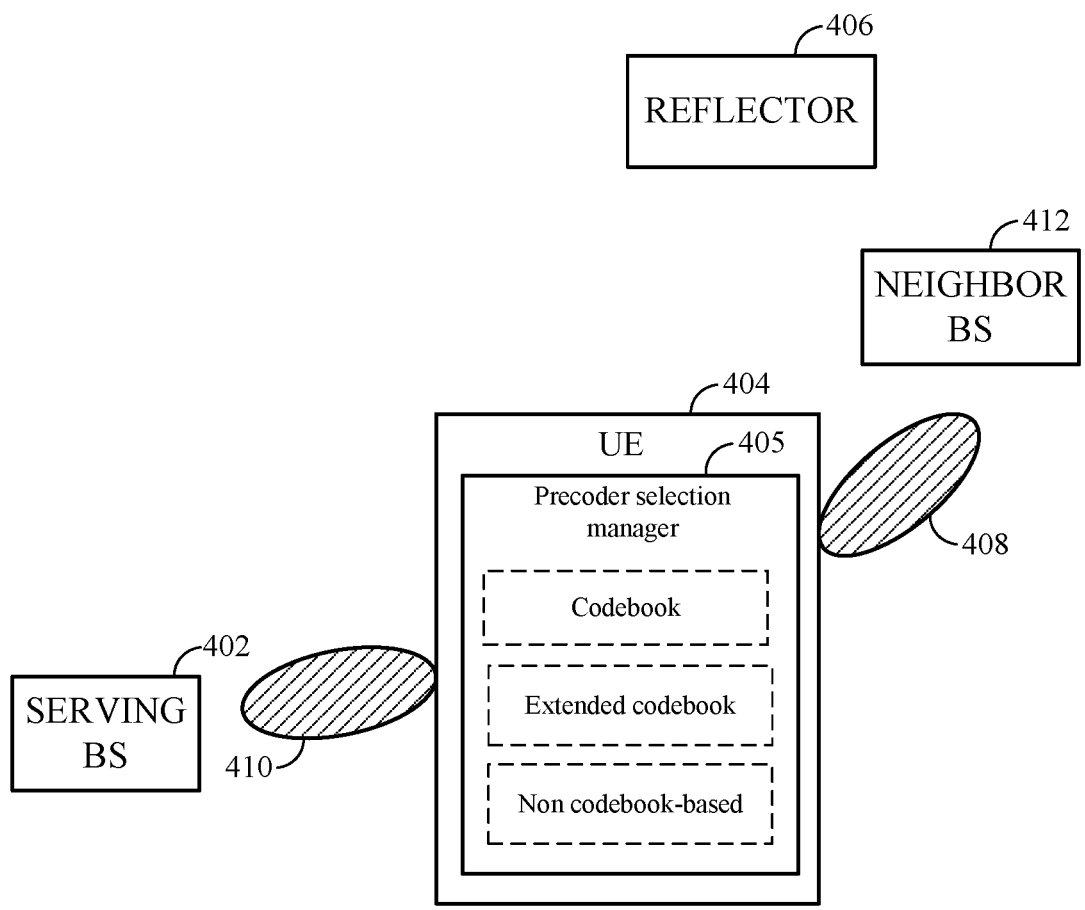
FIG. 4 illustrates an uplink transmission scenario using different antenna panels, in accordance with certain aspects of the present disclosure.

FIG. 4 illustrates an example multi-panel uplink transmission scenario leading to different signals path which may cause different amounts of interference by different uplink signals transmitted from the UE via different transmission configurations, in accordance with certain aspects of the present disclosure. As shown in FIG. 4, the UE 404 can send a first uplink transmission 410 to the BS 402 with a first transmission configuration (e.g., a first antenna, beam, and/or antenna panel). As shown in FIG. 4, the first uplink transmission with the first transmission configuration may be oriented generally towards the serving BS 402. The UE can send a second uplink transmission 408 using a second uplink transmission 408 configuration (e.g., a second antenna, beam, and/or antenna panel). In some examples, the first uplink transmission 410 and the second uplink transmission 408 may be transmitted simultaneously or concurrently. As shown in FIG. 4, the second uplink transmission 408 may be oriented generally in a different direction than the first uplink transmission 410, which may be toward a reflector 406 and/or a neighboring BS 412. Thus, in the example shown in FIG. 4, the uplink signal using the first transmission configuration may cause relatively little or no interference to the neighbor BS 412, while an uplink signal using the second transmission configuration may cause relatively higher interference to the neighbor BS 412.

Figure 5:
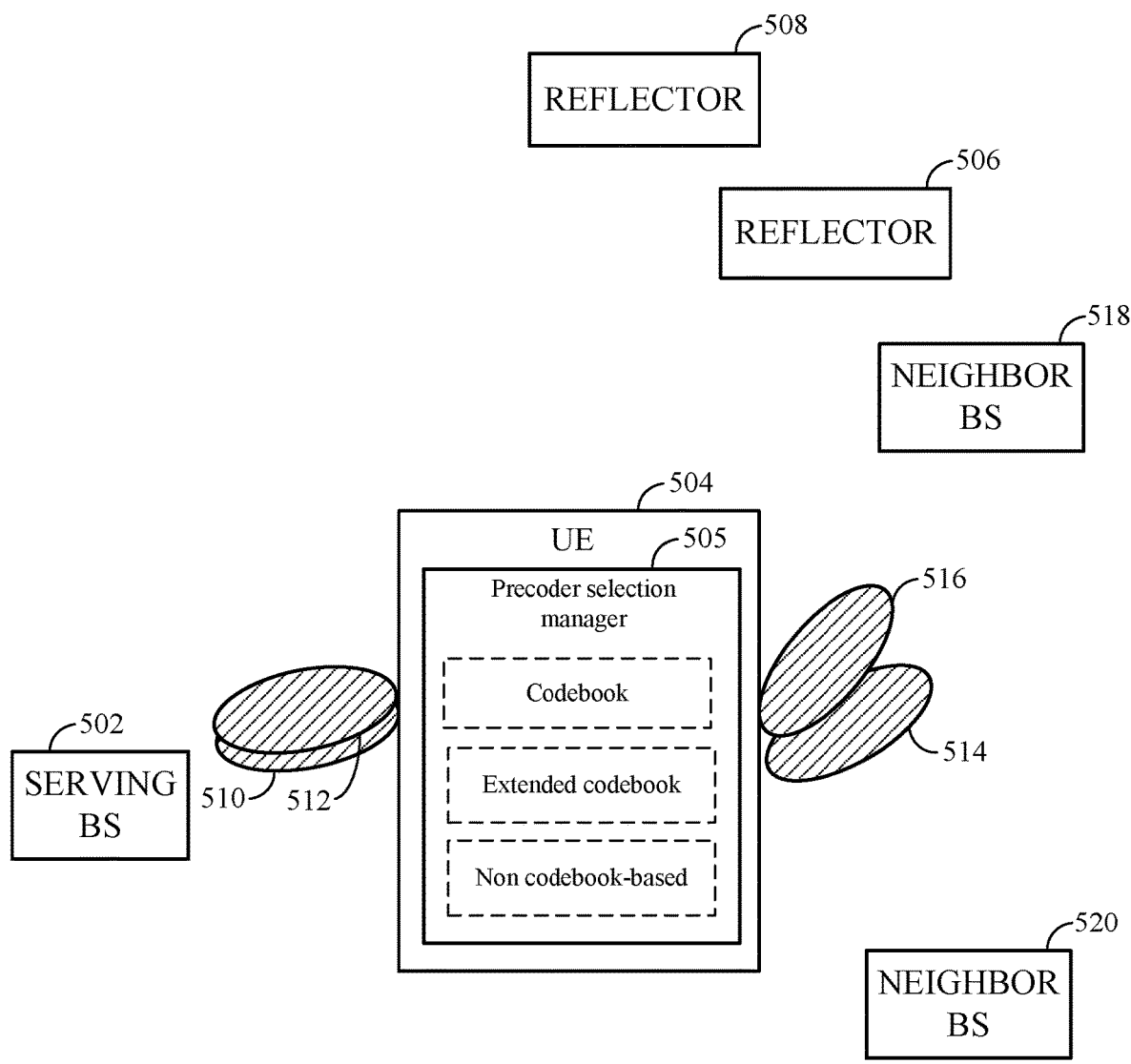
FIG. 5 illustrates another uplink transmission scenario using different antenna beams, in accordance with certain aspects of the present disclosure.

The uplink transmission scenario illustrated in FIG. 4 is merely illustrative. It should be appreciated that many different scenarios are possible, and may lead to different signals paths and different amounts of interference by different uplink signals transmitted from the UE via different transmission configurations. For example, as shown in FIG. 5, the UE 504 can transmit multiple uplink transmissions 510, 512, 514, 516 using different transmission configurations for each of the uplink transmissions. For example, the different transmission configurations may use different antenna panels, different beams in beamformed directions from one antenna panel, or both different antenna panels and different beamformed directions. As shown in FIG. 5, uplink transmissions 510, 512 may be oriented generally towards the serving BS 502, while uplink transmissions 514, 516 may be oriented generally towards a neighboring BS 518. The uplink transmissions can use only a single panel/array and/or beam at a time, or the UE can transmit simultaneous uplink transmissions using multiple different antenna panels/arrays and/or beams. The serving BS 502, UE 504, and neighbor BSs 518, 520 may include any number of arrays and arrays including any number of antennas. The antennas and/or antenna panels/arrays may be at any location on the front, sides, or back of the UE, and there may be any number of uplink transmissions transmitted via the multiple antennas and/or antenna panels. There may be various numbers of neighboring BSs and/or other UEs interfered by uplink transmissions from the UE 504. Further, there could be various numbers of signal reflectors, at multiple different possible locations in the system, that reflect signals in any of various directions, and any one signal could be reflected via multiple signal reflectors, which can result in various levels of interference and/or potential interference caused by uplink transmissions via the different antenna panels/arrays and/or beams to one or more neighboring BSs.

As will be discussed in more detail below, the UE can perform precoder selection for uplink transmission. As shown in FIG. 4 and FIG. 5, the UE 404 and the UE 504 can include a precoder manager 405 and 505, respectively. The precoder managers 405 and 505 may be configured to select precoders for uplink transmission. As shown in FIGS. 4 and 5, and discussed herein, the precoder selection may be codebook-based or non codebook-based. Further, codebook-based precoder selection may be based on an expanded codebook to accommodate multi-panel uplink transmission.

Precoding is a preprocessing technique to support multi-layer (e.g., multi-stream) transmission. Precoding may exploit transmit diversity and increase throughput in multiantenna wireless communications by applying weighting to the information stream (e.g., layer). For example, information bits may be encoded to produce one or more codewords. After scrambling and modulation, each codeword may be mapped to one or more layers (e.g., streams). The number of layers may be based in part on a rank indicator. Precoding applies precoders to map each layer to one or more UE antenna ports (e.g., logical channel ports that can be spread across a single or multiple antennas). The precoded layers can then be mapped to resource elements (REs) and the signal may be generated and transmitted via the corresponding antenna ports. A precoder may refer to a precoding matrix.

In certain systems, for codebook-based uplink transmission, the base station (BS) chooses the precoder for uplink transmission and signals the selected precoder to the user equipment (UE). The precoders may be designed for single panel uplink transmission. A codebook may include vectors and matrices that may correspond to precoders. Examples of codebooks may be found in the IEEE wireless standards. However, as discussed above, certain systems, such as NR systems, may support multi-panel uplink transmission.

Example Precoders for Multi-Panel Uplink Transmission

Aspects of the present disclosure provide techniques for precoding for multi-panel uplink transmission. In some examples, an expanded codebook is provided for multi-panel uplink transmission. In some examples, a user equipment (UE) can indicate preferred or selected precoders to a base station (BS). In some examples, the UE can indicate different precoders for different scenarios, such as depending on single or multi-panel uplink transmission. In some examples, for non-codebook based transmission, the BS can transmit simultaneous reference signals (RS) to the UE for the UE to compute precoders for multi-panel uplink transmission.

Example Expanded UE Codebook for Multi-Panel Uplink Transmission

According to certain aspects, an expanded UE codebook may be used at the UE, for example, to support multi-panel uplink transmission.

In certain systems, the UE codebook contains precoding matrices mapping up to four layers to up to four UE antenna ports. For example, the UE codebook may contain precoding matrices mapping one or two layers to two or four UE antenna ports (e.g., 1-to-2, 1-to-4, 2-to-2, 2-to-4 layers to UE antenna ports), mapping three layers to four UE antenna ports (3-to-4), and/or mapping four layers to four UE antenna ports (4-to-4).

In some examples, a multi-panel uplink transmission may use two panels, each panel transmitting one layer. In this case, the UE codebook may be sufficient. However, in other cases, it may desirable to map more than four layers and/or more than four UE antenna ports. Thus, an expanded UE codebook may be used for multi-panel uplink transmission. For example, the expanded UE codebook may contain precoding matrices mapping to five, six, or seven (or more) UE antenna ports. With higher number of UE antenna ports, the number of layers mapped to the UE antenna ports can also be higher, such as five or more layers.

Figure 6:
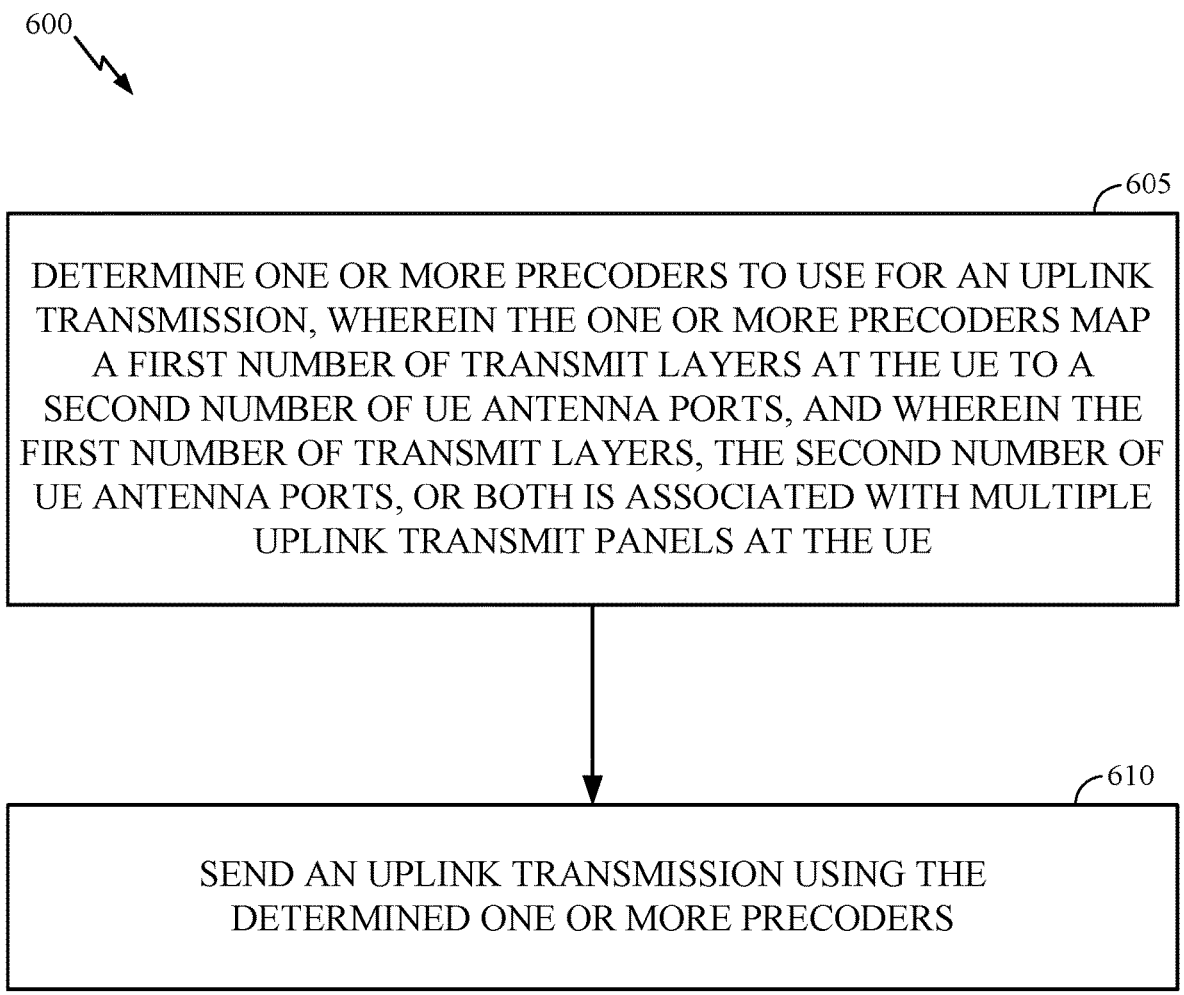
FIG. 6 is a flow diagram illustrating example operations by a UE for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as a UE 120a in the wireless communication network 100). Operations 600 may be implemented as software components that are executed and run on one or more processors (e.g., processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 600 may begin, at 605, by determining one or more precoders to use for an uplink transmission (e.g., a multi-panel uplink transmission). The one or more precoders map a first number of transmit layers at the UE to a second number of UE antenna ports, where the first number of transmit layers, the second number of UE antenna ports, or both is associated with multiple transmit panels at the UE. In some examples, the first number of transmit layers, the second number of UE antenna ports, or both is greater than four.

At 610, the UE sends an uplink transmission using the determined one or more precoders.

In some examples, the precoding matrix can be three different types: fully coherent, partial coherent, and non-coherent. The type of precoder used for uplink transmission may be dependent on UE capability. In certain systems (e.g., systems not using multi-panel uplink transmission), if the UE can transmit coherently over all antenna ports (e.g., the UE can control relative phases between all transmit chains), then a fully coherent precoding matrix can be used; if the UE can transmit coherently only over pairs of antenna ports, then a partially coherent precoding matrix can be used; and if the UE cannot transmit coherently over any antenna ports, then a non-coherent precoding matrix can be used.

According to certain aspects, for multi-panel uplink transmission, the types of precoders may be expanded to include the concept of panels. For example, if the UE can transmit coherently over all panels, then a fully coherent precoding matrix can be used; if the UE can transmit coherently over all antenna ports in a panel, but antenna ports over different panels cannot be transmitted coherently, then a partially coherent precoding matrix may be used; and if the UE cannot transmit coherently over any antenna ports, then a non-coherent precoding matrix can be used.

The UE may transmit an indication of the UE capability to the BS. In some examples, the BS may determine (e.g., select) a precoding matrix to indicate to the UE based at least in part on the UE capability.

According to certain aspects, precoding matrix selection in downlink control information (DCI) may be expanded to accommodate an increased number of bits to support the expanded UE codebook. In some examples, the DCI specifies one large precoding matrix for all UE antenna panels. In some examples, the DCI specifies multiple smaller precoding matrices, such as one precoding matrix for each UE antenna panel. The larger or multiple smaller matrices may be used in the DCI depending on the codebook (e.g., the size of the codebook). The UE may determine the uplink precoder based on the indication in the DCI from the BS.

Example UE Preferred/Selected Uplink Precoder Indication for Multi-Panel Uplink Transmission According to certain aspects, the UE may signal a preferred precoder subset or one or more selected precoders for codebook-based uplink transmission.

Figure 7:
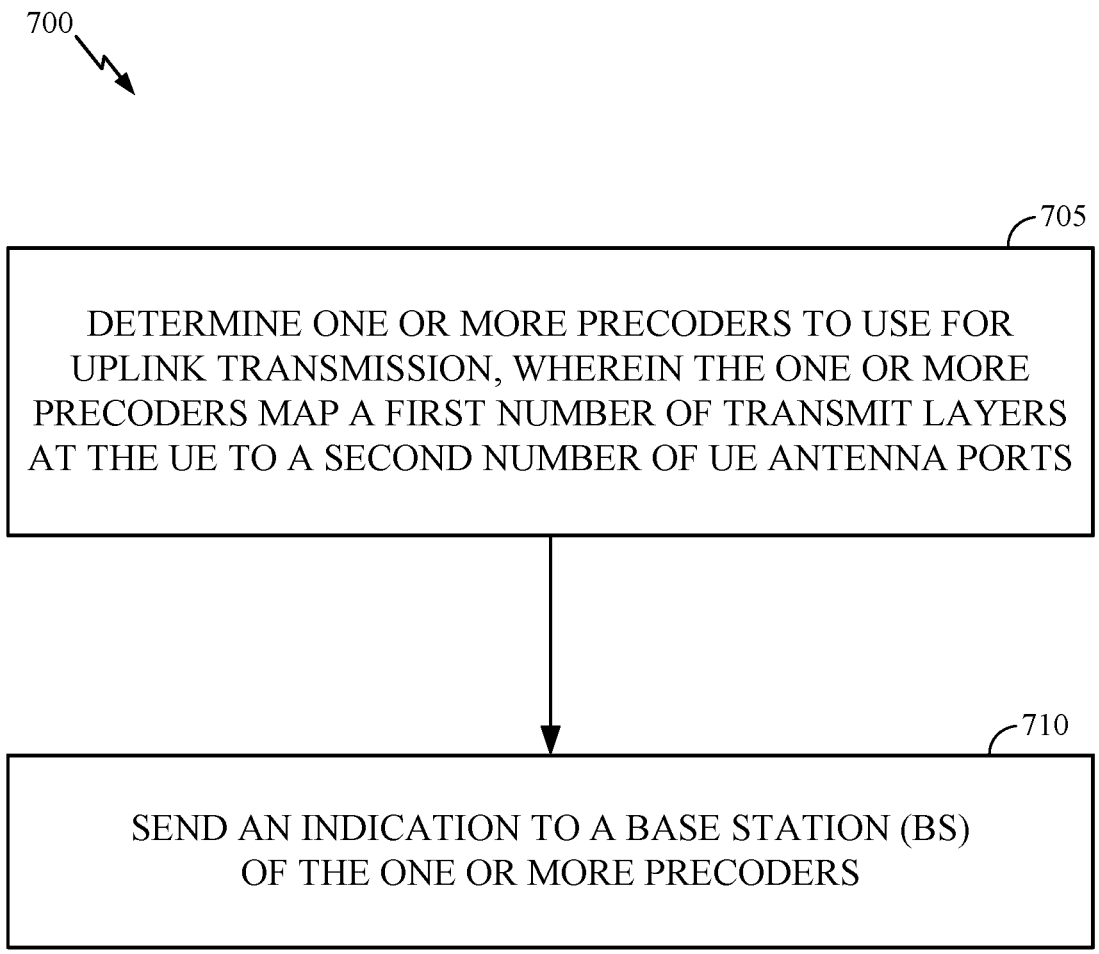
FIG. 7 is another flow diagram illustrating example operations by a UE for wireless communication, in accordance with certain aspects of the present disclosure.

FIG. 7 is another flow diagram illustrating example operations 700 for wireless communication, that may be performed by a UE, in accordance with certain aspects of the present disclosure. Operations 700 may be implemented as software components that are executed and run on one or more processors (e.g., processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 700 may begin, at 705, by determining one or more precoders for uplink transmission. The one or more precoders map a first number of transmit layers at the UE to a second number of UE antenna ports. The one or more precoders may be from an expanded UE codebook, for example, the expanded UE codebook described above.

At 710, the UE sends an indication to a BS of the one or more precoders.

According to certain aspects, the UE indicates a subset of preferred precoders to the BS. In some examples, the UE may indicate to the BS whether the UE prefers single-panel or multiple-panel transmission. The UE may indicate which UE antenna panels are preferred. The UE may indicate different subsets of preferred precoders for single-panel and multi-panel transmission. The UE may indicate preferred precoders for each panel (e.g., for each of the indicted preferred panels). The UE preferences may be to avoid interference to neighbors, to avoid MPE (maximum permissible exposure) issues, and/or due to UE capabilities. In some examples, the UE may determine the preferred UE antenna panels based on a level of interference caused by transmission using the one or more UE antenna panels to one or more neighbor cells, based on a level of radiation to a user caused by transmission using the one or more UE antenna panels, based on a capability of the UE to transmit coherently within or across the one or more UE antenna panels, and/or based on a combination thereof.

The BS may take the indicated UE preferences into account when scheduling uplink transmission. For example, the BS may schedule the UE single or multi-panel transmission in accordance with the indication from the UE. The BS may schedule particular panels and/or indicate particular precoders for the uplink transmission in accordance with the indication from the UE. The BS may send DCI scheduling the uplink transmission and indicating the panels and/or precoders for the UE to use.

According to certain aspects, the UE selects the precoders to use for uplink transmissions and indicates (e.g., signals) the selected precoders to the BS. The UE may know the transmit power imbalance between multiple panels and can better select precoder matrices to use at the time of uplink transmission. For example, the power imbalance may be due to MPE issues, such as which panels are pointing towards the user (e.g., toward the human body) and may need reduced transmit power (e.g., to meet specific absorption rate (SAR) limits). In this case, the BS may not need to indicate precoders to the UE in DCI, because the UE decides the precoders for uplink transmission. In some examples, the UE indicates the selected precoders to the BS in the scheduling request.

Figure 8:
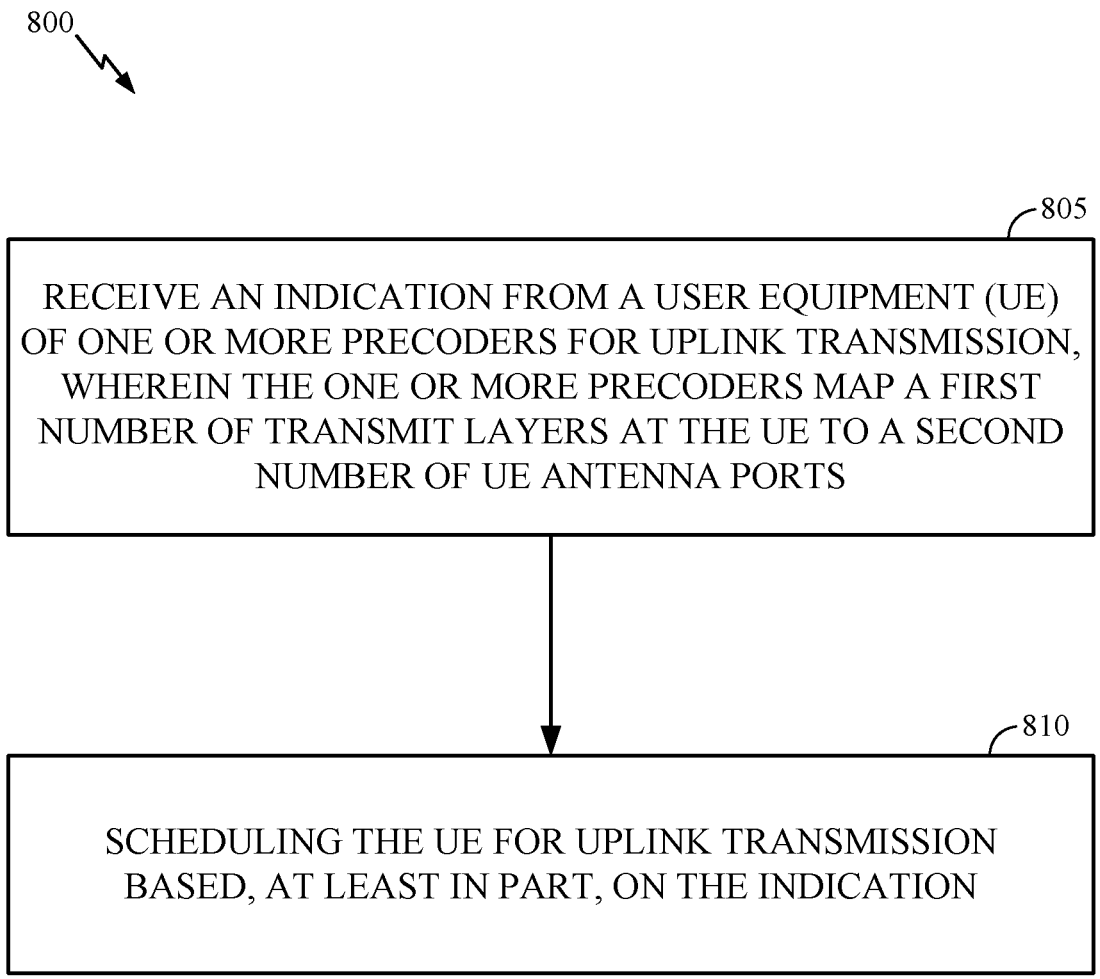
FIG. 8 is a flow diagram illustrating example operations by a BS for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as a BS 110a in the wireless communication network 100). The operations 800 may be complimentary operations by the BS to the operations 700 performed by the UE. Operations 800 may be implemented as software components that are executed and run on one or more processors (e.g., processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 800 may begin, at 805, by receiving an indication from a UE of one or more precoders for uplink transmission. The one or more precoders map a first number of transmit layers at the UE to a second number of UE antenna ports. The indicated one or more precoders may be preferred or selected precoders.

At 810, the BS schedules the UE for uplink transmission based, at least in part, on the indication. For example, as discussed above, the BS may schedule single-panel or multi-panel uplink transmission, the BS may schedule particular UE antenna panels, the BS may schedule the UE to use the indicated preferred precoders, etc.

Example Uplink Precoder Determination for Non-Codebook Based Multi-Panel Uplink Transmission In some cases, uplink transmission is non-codebook based. The UE computes the precoders for the uplink transmission, for example, by estimating the channel based on reference signals from the BS. For example, the UE estimates the channel between the UE's transmit panel and the BS's receive panel based on a channel reciprocity assumption (assuming the UL channel is the same as the DL channel).

According to certain aspects, for multi-panel uplink transmission, the UE estimates the channel for multiple panels, for example, based on RSs transmitted simultaneous by the BS.

Figure 9:
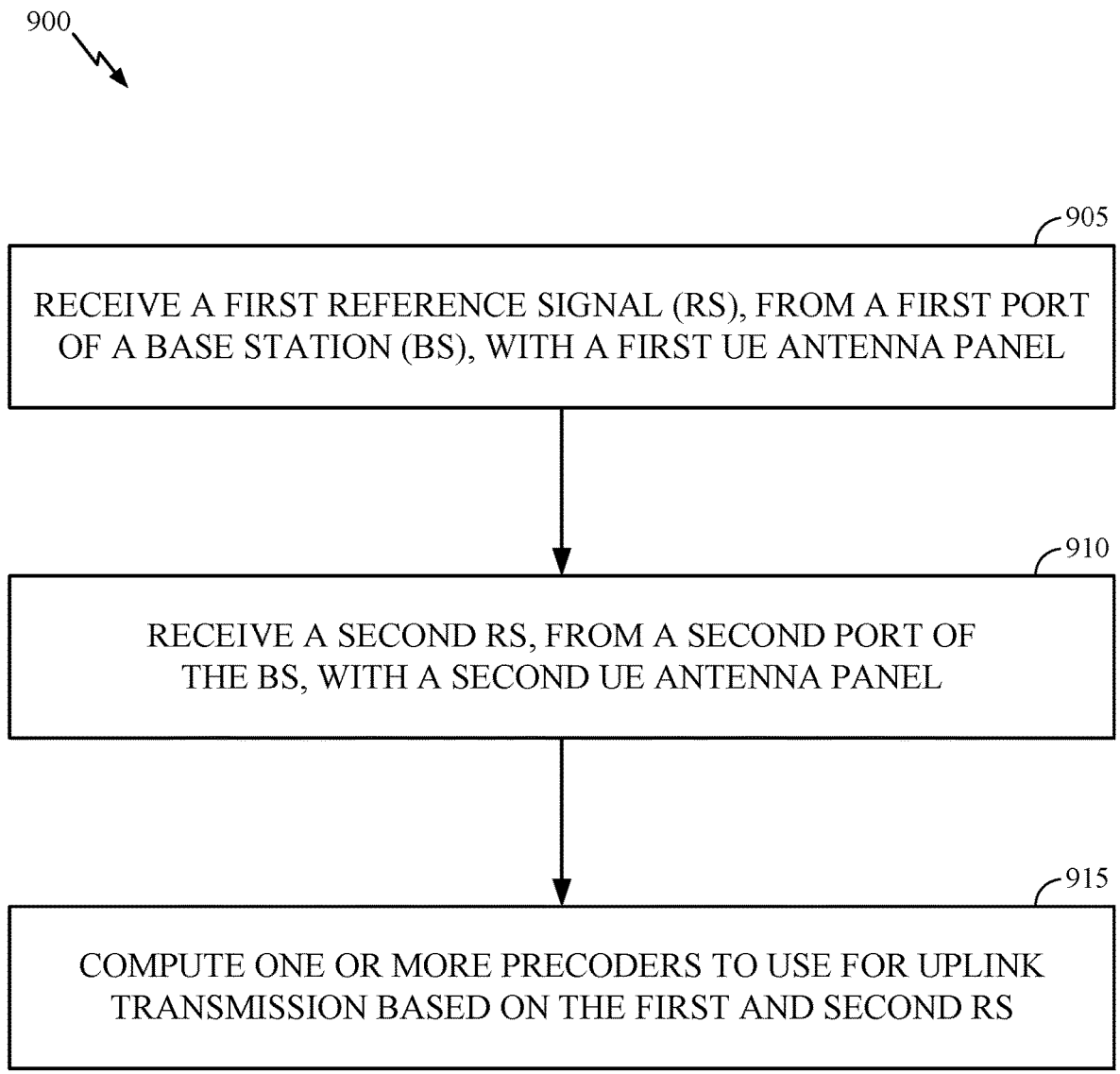
FIG. 9 is another flow diagram illustrating example operations by a UE for wireless communication, in accordance with certain aspects of the present disclosure.

FIG. 9 is another flow diagram illustrating example operations 900 for wireless communication that may be performed by a UE, in accordance with certain aspects of the present disclosure. Operations 900 may be implemented as software components that are executed and run on one or more processors (e.g., processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 900 may begin, at 905, by receiving a first RS, from a first port of a BS, with a first UE antenna panel. In some examples, the first RS is a channel state information RS (CSI-RS).

At 910, the UE receives a second RS (e.g., a second CSI-RS), from a second port of the BS, with a second UE antenna panel. In some examples, the BS transmits the first and second RS simultaneously (or near simultaneously).

At 915, the UE computes one or more precoders to use for uplink transmission based on the first and second RSs. For a multi-panel uplink transmission, the UE may rely on cross-link interference to compute the precoders. The cross-link interference can be estimated from the CSI-RS (e.g., the CSI-RS associated with all sounding reference signal (SRS) resource sets corresponding to multi-panel uplink transmission). The cross-link interference can be efficiently estimated if the CSI-RS are transmitted simultaneously.

Figure 10:
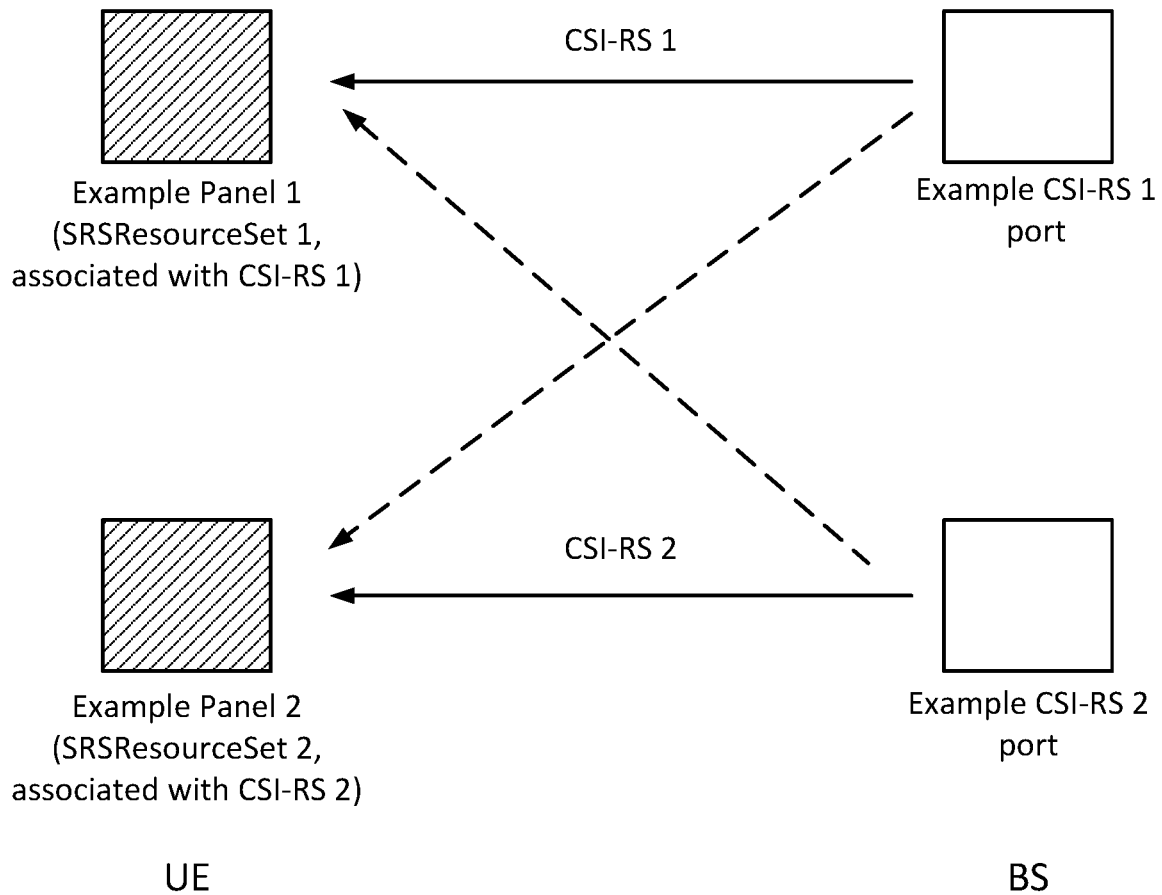
FIG. 10 is a diagram illustrating example channel state information reference signal (CSI-RS) transmissions from two BS ports received at two UE antenna panels for computing precoders for non-codebook based uplink transmission, in accordance with certain aspects of the present disclosure.

FIG. 10 is a diagram illustrating example CSI-RS transmissions from two BS ports received at two UE antenna panels for computing precoders for non-codebook based uplink transmission, in accordance with certain aspects of the present disclosure. As shown in FIG. 10, the first UE antenna panel (Panel 1) is associated with a first SRS resource set (SRSResource Set 1) associated with CSI-RS 1 transmitted from the first port of the BS (CSI-RS port 1) to the UE and the second UE antenna panel (Panel 2) is associated with a second SRS resource set (SRSResource-Set2) associated with the CSI-RS 2 transmitted from the second port of the BS to the UE. If the CSI-RS 1 and CSI-RS 2 are transmitted simultaneously, the UE can estimate cross-link from Panel 1 to the CSI-RS 2 port at the BS, without having the Panel 1 explicitly being associated with CSI-RS 2, and similarly the UE can estimate cross-link from Panel 2 to the CSI-RS 1 port at the BS, without having the Panel 2 explicitly being associated with CSI-RS 1.

Figure 11:
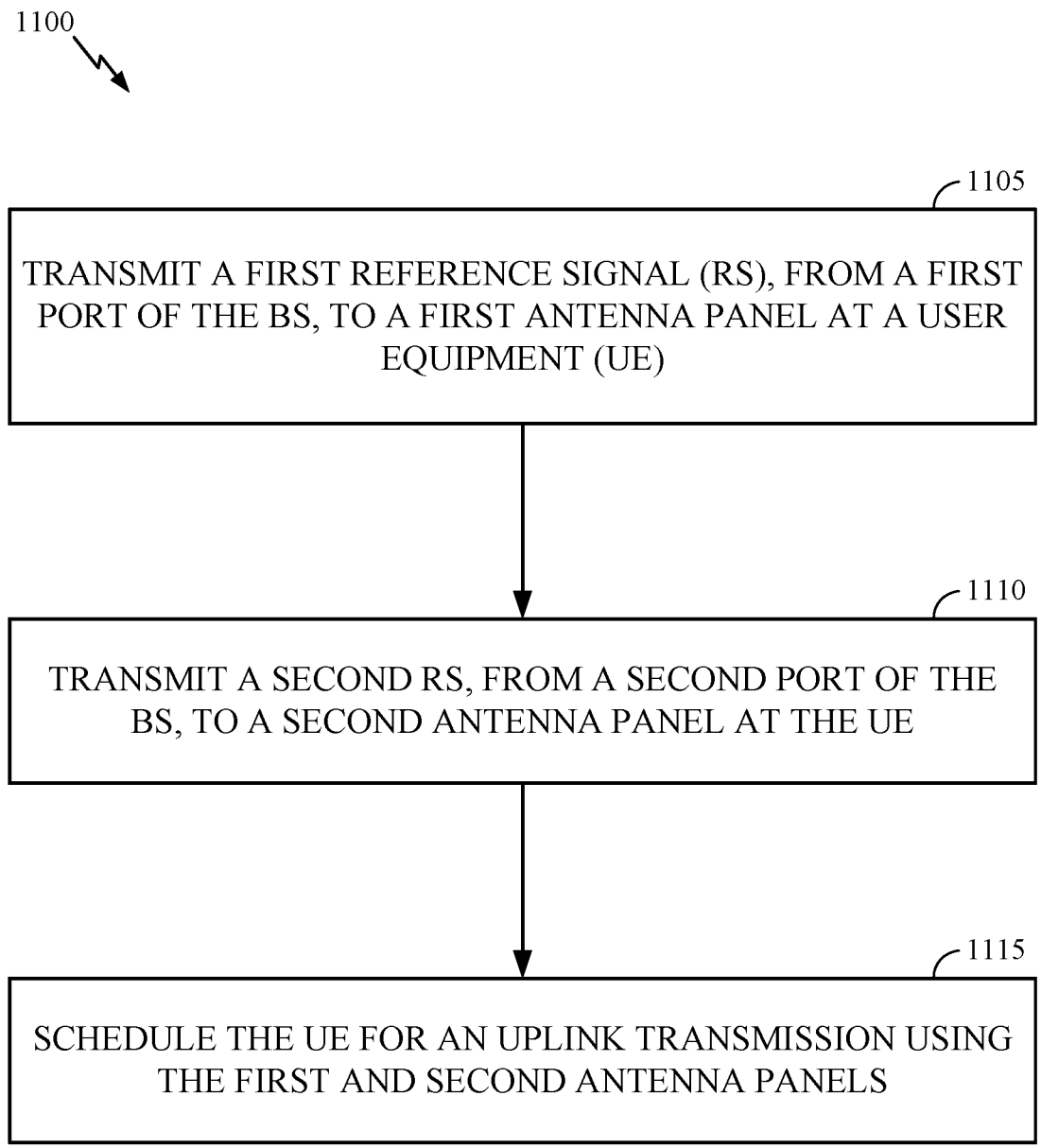
FIG. 11 is another flow diagram illustrating example operations by a BS for wireless communication, in accordance with certain aspects of the present disclosure.

FIG. 11 is another flow diagram illustrating example operations 1100 for wireless communication, in accordance with certain aspects of the present disclosure. The operations 1100 may be performed, for example, by a BS (e.g., such as a BS 110a in the wireless communication network 100). The operations 1100 may be complimentary operations by the BS to the operations 900 performed by the UE. Operations 1100 may be implemented as software components that are executed and run on one or more processors (e.g., processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 1100 may begin, at 1105, by transmitting a first RS (e.g., CSI-RS) from a first port of the BS to a first antenna panel at a UE.

At 1110, the BS transmits a second RS (e.g., CSI-RS) from a second port of the BS to a second antenna panel at the UE. In some examples, the BS transmits the first and second RSs simultaneously (or near simultaneously).

At 1115, the BS schedules the UE for an uplink transmission (e.g., a multi-panel uplink transmission) using the first and second antenna panels.

Figure 12:
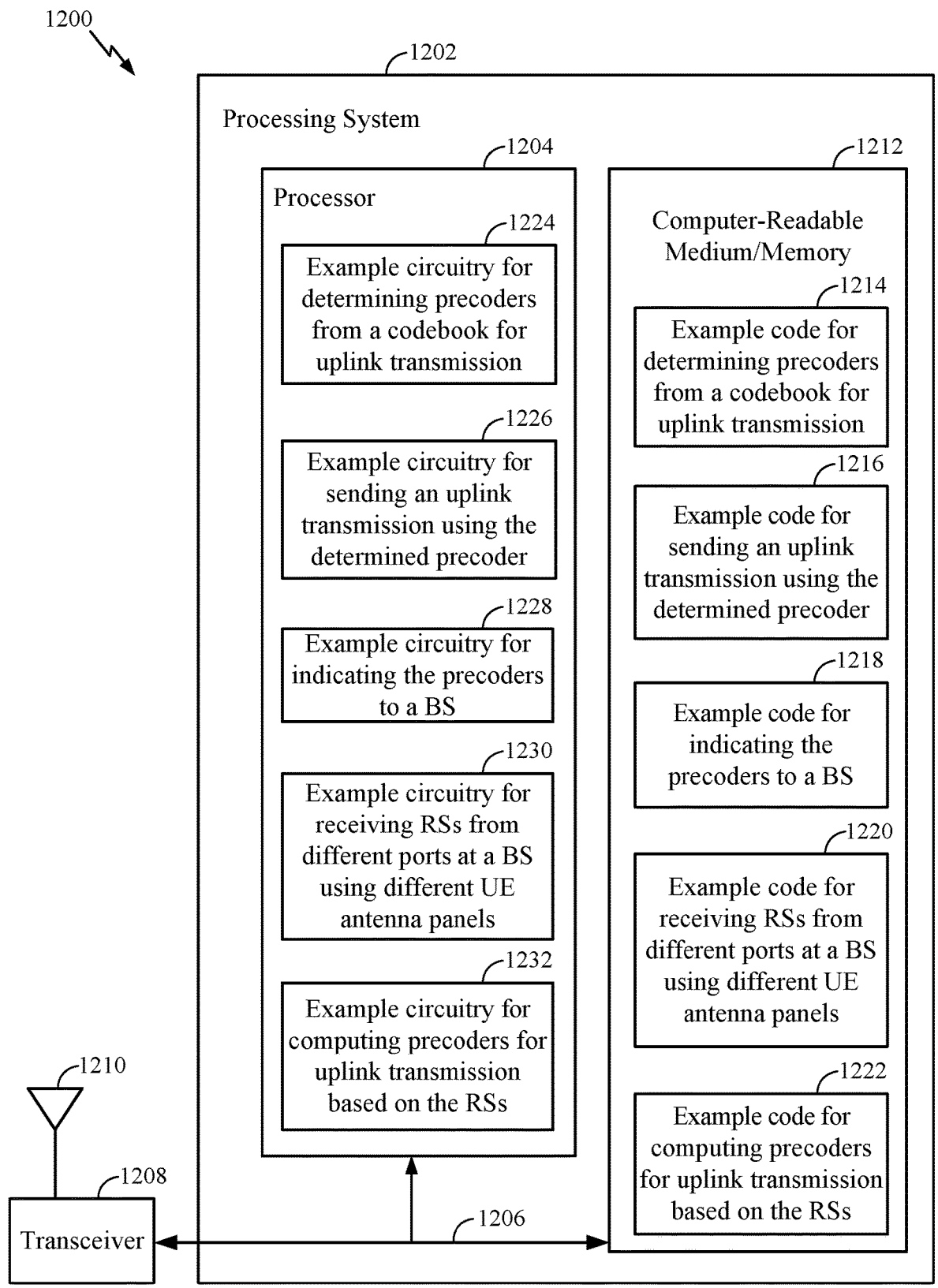
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 6, FIG. 7, and/or FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, FIG. 7, and/or FIG. 9, or other operations for performing the various techniques discussed herein for precoding for multi-panel uplink transmission. In certain aspects, computer-readable medium/memory 1212 stores code 1214 for determining precoders from a codebook for uplink transmission; code 1216 for sending an uplink transmission using the determined precoder; code 1218 for indicating the precoders to a BS; code 1220 for receiving RSs from different BS ports at different UE antenna panels; and/or code 1222 for computing precoders for uplink transmission based on the RSs. In certain aspects, the processor 1204 has circuitry configured to implement the code stored in the computer-readable medium/memory 1212. The processor 1204 includes circuitry 1224 for determining precoders from a codebook for uplink transmission; circuitry 1226 for sending an uplink transmission using the determined precoder; circuitry 1228 for indicating the precoders to a BS; circuitry 1230 for receiving RSs from different BS ports at different UE antenna panels; and/or circuitry 1232 for computing precoders for uplink transmission based on the RSs.

Figure 13:
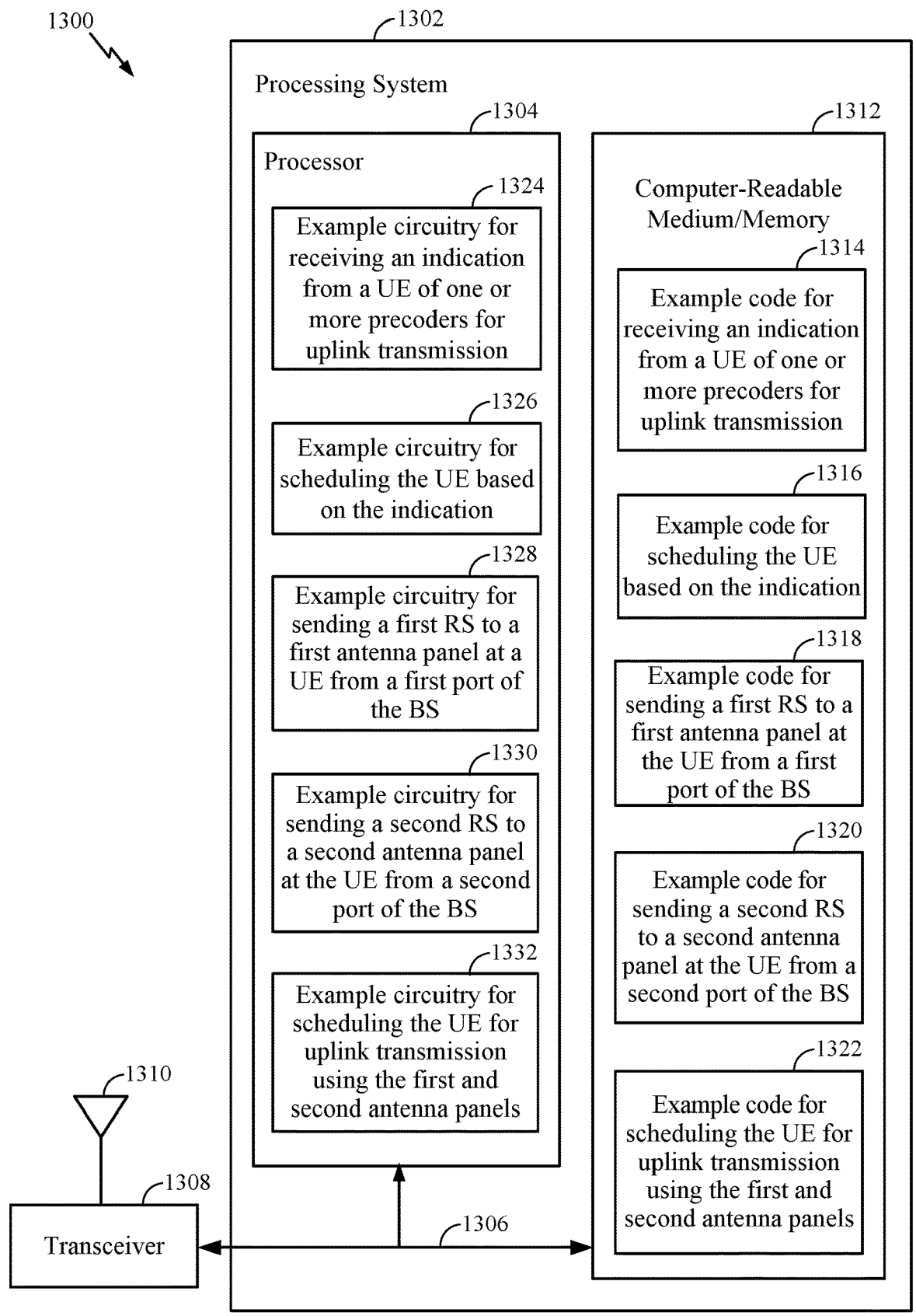
FIG. 13 illustrates another communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8 and/or FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8 and/or FIG. 11, or other operations for performing the various techniques discussed herein for precoding for multi-panel uplink transmission. In certain aspects, computer-readable medium/memory 1312 stores code 1314 for receiving an indication from a UE of one or more precoders for uplink transmission; code 1316 for scheduling the UE based on the indication; code 1318 for sending a first RS to a first antenna panel at the UE from a first port of the BS; code 1320 for sending a second RS to a second antenna panel at the UE from a second port of the BS; and/or code 1322 for scheduling the UE for uplink transmission using the first and second antenna panels. In certain aspects, the processor 1304 has circuitry configured to implement the code stored in the computer-readable medium/memory 1312. The processor 1304 includes circuitry 1324 for receiving an indication from a UE of one or more precoders for uplink transmission; circuitry 1326 for scheduling the UE based on the indication; circuitry 1328 for sending a first RS to a first antenna panel at the UE from a first port of the BS; circuitry 1330 for sending a second RS to a second antenna panel at the UE from a second port of the BS; and/or circuitry 1332 for scheduling the UE for uplink transmission using the first and second antenna panels.

Example Aspects

In a first aspect, a method for wireless communication by a user equipment (UE) includes determining one or more precoders to use for one or more uplink transmissions, the one or more precoders mapping a first number of transmit layers at the UE to a second number of UE antenna ports, and the first number of transmit layers, the second number of UE antenna ports, or both being associated with multiple uplink transmit panels at the UE. The UE sends the one or more uplink transmissions using the determined one or more precoders.

In a second aspect, in combination with the second aspect, a type of the one or more precoders is based on a UE capability to transmit coherently over at least some UE antennas, over pairs of UE antennas, over all UE antennas within a UE antenna panel, or over all antennas within all UE antenna panels.

In a third aspect, in combination with one or more of the first and second aspects, the type of the one or more precoders includes fully coherent, partially coherent, or non-coherent.

In a fourth aspect, in combination with one or more of the first through third aspects, the UE transmits an indication of the UE capability to a base station (BS).

In a fifth aspect, in combination with one or more of the first through fourth aspects, the UE receives downlink control information (DCI) from a base station (BS) indicating the one or more precoders, the determination of the one or more precoders being based on the indication in the DCI.

In a sixth aspect, in combination with one or more of the first through fifth aspects, the first number of transmit layers, the second number of UE antenna ports, or both is greater than four.

In a seventh aspect, a method for wireless communication by a user equipment (UE) includes determining one or more precoders for uplink transmission, the one or more precoders mapping a first number of transmit layers at the UE to a second number of UE antenna ports. The UE sends an indication to a base station (BS) of the one or more precoders.

In an eighth aspect, in combination with the seventh aspect, the UE sends the BS an indication of whether single-panel or multi-panel uplink transmission is preferred.

In a ninth aspect, in combination with one or more of the seventh and eighth aspects, the UE sends the BS an indication of one or more preferred UE antenna panels.

In a tenth aspect, in combination with one or more of the seventh through ninth aspects, the UE determines the one or more preferred UE antenna panels based on a level of interference caused by transmission using the one or more UE antenna panels to one or more neighbor cells, a level of radiation to a user caused by transmission using the one or more UE antenna panels, a capability of the UE to transmit coherently within or across the one or more UE antenna panels, or a combination thereof.

In an eleventh aspect, in combination with one or more of the seventh through tenth aspects, the UE sends the BS an indication one or more preferred precoders for each of the one or more UE antenna panels.

In a twelfth aspect, in combination with one or more of the seventh through eleventh aspects, the UE determines the one or more preferred precoders based on a capability of the UE, a type of the precoders, or both.

In a thirteenth aspect, in combination with one or more of the seventh through twelfth aspects, the one or more preferred precoders for each of the one or more UE antenna panels includes at least a first preferred precoder for single-panel uplink transmission and a second preferred precoder for multi-panel uplink transmission.

In a fourteenth aspect, in combination with one or more of the seventh through thirteenth aspects, determining the one or more precoders includes selecting the one or more precoders for uplink transmission using one or more UE antenna panels and sending the BS an indication of the selected one or more precoders.

In a fifteenth aspect, in combination with one or more of the seventh through fourteenth aspects, the one or more precoders are selected based, at least in part, on a transmit power level associated with the one or more UE antenna panels.

In a sixteenth aspect, in combination with one or more of the seventh through fifteenth aspects, the one or more precoders are indicated in a scheduling request to the BS.

In a seventeenth aspect, in combination with one or more of the seventh through sixteenth aspects, the one or more precoders are selected from a codebook.

In an eighteenth aspect, in combination with one or more of the seventh through ninth aspects, a method for wireless communication by a user equipment (UE) includes receiving a first reference signal (RS), from a first port of a base station (BS), with a first UE antenna panel. The UE receives a second RS, from a second port of the BS, with a second UE antenna panel and computes one or more precoders to use for uplink transmission based on the first and second RSs.

In a nineteenth aspect, in combination with the eighteenth aspect, the first and second RSs include channel state information RSs (CSI-RS).

In a twentieth aspect, in combination with one or more of the eighteenth and nineteenth aspects, the first and second RSs are received concurrently.

In a twenty-first aspect, in combination with one or more of the eighteenth through twentieth aspects, the first UE antenna panel is associated with a first sounding reference signal (SRS) resource set, the first SRS resource set being associated with the first port of the BS; and the second UE antenna panel is associated with a second SRS resource set, the second SRS resource set being associated with the second port of the BS.

In a twenty-second aspect, in combination with one or more of the eighteenth through twenty-first aspects, the UE estimates interference caused to a link between the second UE antenna panel and the second port of the BS based on the first RS; and the UE estimates interference caused to a link between the first UE antenna panel and the first port of the BS based on the second RS, the one or more precoders being computed based on the estimated interference.

In a twenty-third aspect, in combination with one or more of the eighteenth through twenty-second aspects, estimating the interference includes measuring the second RS at the first UE antenna panel; estimating the uplink channel between the first UE antenna panel and the second port of the BS based on channel reciprocity; measuring the first RS at the second UE antenna panel; and estimating the uplink channel between the second UE antenna panel and the first port of the BS based on channel reciprocity.

In a twenty-fourth aspect, in combination with one or more of the eighteenth through twenty-third aspects, the one or more precoders are computed for each UE antenna panel for a simultaneous multi-panel uplink transmission.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU). A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6-9 and FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving a first reference signal (RS), from a first port of a base station (BS), with a first UE antenna panel;
   receiving a second RS, from a second port of the BS, with a second UE antenna panel; and
   computing one or more precoders to use for uplink transmission to the BS based on the first RS and the second RS.

2. The method of claim 1, wherein the first RS and the second RS comprise channel state information RSs (CSI-RS).

3. The method of claim 1, wherein the first RS and the second RS are received concurrently.

4. The method of claim 1, wherein:
   the first UE antenna panel is associated with a first sounding reference signal (SRS) resource set, the first SRS resource set being associated with the first port of the BS; and
   the second UE antenna panel is associated with a second SRS resource set, the second SRS resource set being associated with the second port of the BS.

5. The method of claim 1, further comprising:
   estimating first interference caused to a first link between the second UE antenna panel and the second port of the BS based on the first RS; and
   estimating second interference caused to a second link between the first UE antenna panel and the first port of the BS based on the second RS, wherein the one or more precoders are computed based on the estimated first interference and the estimated second interference.

6. The method of claim 1, further comprising:
   measuring the second RS at the first UE antenna panel;
   estimating a first uplink channel between the first UE antenna panel and the second port of the BS based on the measurement of the second RS and channel reciprocity;
   measuring the first RS at the second UE antenna panel; and
   estimating a second uplink channel between the second UE antenna panel and the first port of the BS based on the measurement of the first RS and channel reciprocity.

7. The method of claim 1, wherein the one or more precoders are computed for each UE antenna panel for a simultaneous multi-panel uplink transmission.

8. An apparatus for wireless communication, comprising:
   a memory; and
   one or more processors coupled with the memory, the memory comprising instructions executable by the one or more processors to cause the apparatus to:
   receive a first reference signal (RS), from a first port of a base station (BS), with a first antenna panel;
   receive a second RS, from a second port of the BS, with a second antenna panel; and
   compute one or more precoders to use for uplink transmission to the BS based on the first RS and the second RS.

9. The apparatus of claim 8, wherein the first RS and the second RS comprise channel state information RSs (CSI-RS).

10. The apparatus of claim 8, wherein the first RS and the second RS are received concurrently.

11. The apparatus of claim 8, wherein:
    the first antenna panel is associated with a first sounding reference signal (SRS) resource set, the first SRS resource set being associated with the first port of the BS; and
    the second antenna panel is associated with a second SRS resource set, the second SRS resource set being associated with the second port of the BS.

12. The apparatus of claim 8, wherein the instructions are further executable by the one or more processors to cause the apparatus to:
    estimate first interference caused to a first link between the second antenna panel and the second port of the BS based on the first RS; and
    estimate second interference caused to a second link between the first antenna panel and the first port of the BS based on the second RS, wherein the one or more precoders are computed based on the estimated first interference and the estimated second interference.

13. The apparatus of claim 8, wherein the instructions are further executable by the one or more processors to cause the apparatus to:
    measure the second RS at the first antenna panel;
    estimate a first uplink channel between the first antenna panel and the second port of the BS based on the measurement of the second RS and channel reciprocity;
    measure the first RS at the second antenna panel; and
    estimate a second uplink channel between the second antenna panel and the first port of the BS based on the measurement of the first RS and channel reciprocity.

14. The apparatus of claim 8, wherein the one or more precoders are computed for each antenna panel for a simultaneous multi-panel uplink transmission.

15. An apparatus for wireless communication, comprising:
    means for receiving a first reference signal (RS), from a first port of a base station (BS), with a first antenna panel;
    means for receiving a second RS, from a second port of the BS, with a second antenna panel; and
    means for computing one or more precoders to use for uplink transmission to the BS based on the first RS and the second RS.

16. The apparatus of claim 15, wherein the first RS and the second RS comprise channel state information RSs (CSI-RS).

17. The apparatus of claim 15, wherein the first RS and the second RS are received concurrently.

18. The apparatus of claim 15, wherein:
    the first antenna panel is associated with a first sounding reference signal (SRS) resource set, the first SRS resource set being associated with the first port of the BS; and
    the second antenna panel is associated with a second SRS resource set, the second SRS resource set being associated with the second port of the BS.

19. The apparatus of claim 15, further comprising:
- means for estimating first interference caused to a first link between the second antenna panel and the second port of the BS based on the first RS; and
- means for estimating second interference caused to a second link between the first antenna panel and the first port of the BS based on the second RS, wherein the one or more precoders are computed based on the estimated first interference and the estimated second interference.

20. The apparatus of claim 15, further comprising:
- means for measuring the second RS at the first antenna panel;
- means for estimating a first uplink channel between the first antenna panel and the second port of the BS based on the measurement of the second RS and channel reciprocity;
- means for measuring the first RS at the second antenna panel; and
- means for estimating a second uplink channel between the second antenna panel and the first port of the BS based on the measurement of the first RS and channel reciprocity, wherein the one or more precoders are computed based on the estimation of the first uplink channel and the estimation of the second uplink channel.

21. The apparatus of claim 15, wherein the one or more precoders are computed for each antenna panel for a simultaneous multi-panel uplink transmission.

22. A non-transitory computer readable medium storing computer executable code thereon for wireless communication, comprising:
- code for receiving a first reference signal (RS), from a first port of a base station (BS), with a first antenna panel;
- code for receiving a second RS, from a second port of the BS, with a second antenna panel; and
- code for computing one or more precoders to use for uplink transmission to the BS based on the first RS and the second RS.

23. The non-transitory computer readable medium of claim 22, wherein the first RS and the second RS comprise channel state information RSs (CSI-RS).

24. The non-transitory computer readable medium of claim 22, wherein the first RS and the second RS are received concurrently.

25. The non-transitory computer readable medium of claim 22, wherein:
- the first antenna panel is associated with a first sounding reference signal (SRS) resource set, the first SRS resource set being associated with the first port of the BS; and
- the second antenna panel is associated with a second SRS resource set, the second SRS resource set being associated with the second port of the BS.

26. The non-transitory computer readable medium of claim 22, further comprising:
- code for estimating first interference caused to a first link between the second antenna panel and the second port of the BS based on the first RS; and
- code for estimating second interference caused to a second link between the first antenna panel and the first port of the BS based on the second RS, wherein the one or more precoders are computed based on the estimated first interference and the estimated second interference.

27. The non-transitory computer readable medium of claim 22, further comprising:
- code for measuring the second RS at the first antenna panel;
- code for estimating a first uplink channel between the first antenna panel and the second port of the BS based on the measurement of the second RS and channel reciprocity;
- code for measuring the first RS at the second antenna panel; and
- code for estimating a second uplink channel between the second antenna panel and the first port of the BS based on the measurement of the first RS and channel reciprocity.

28. The non-transitory computer readable medium of claim 22, wherein the one or more precoders are computed for each antenna panel for a simultaneous multi-panel uplink transmission.

* * * * *